No. 609,279. Patented Aug. 16, 1898.
W. A. KILE.
COMBINED COTTON SEED AND CORN PLANTER.
(Application filed Sept. 25, 1897.)
(No Model.)
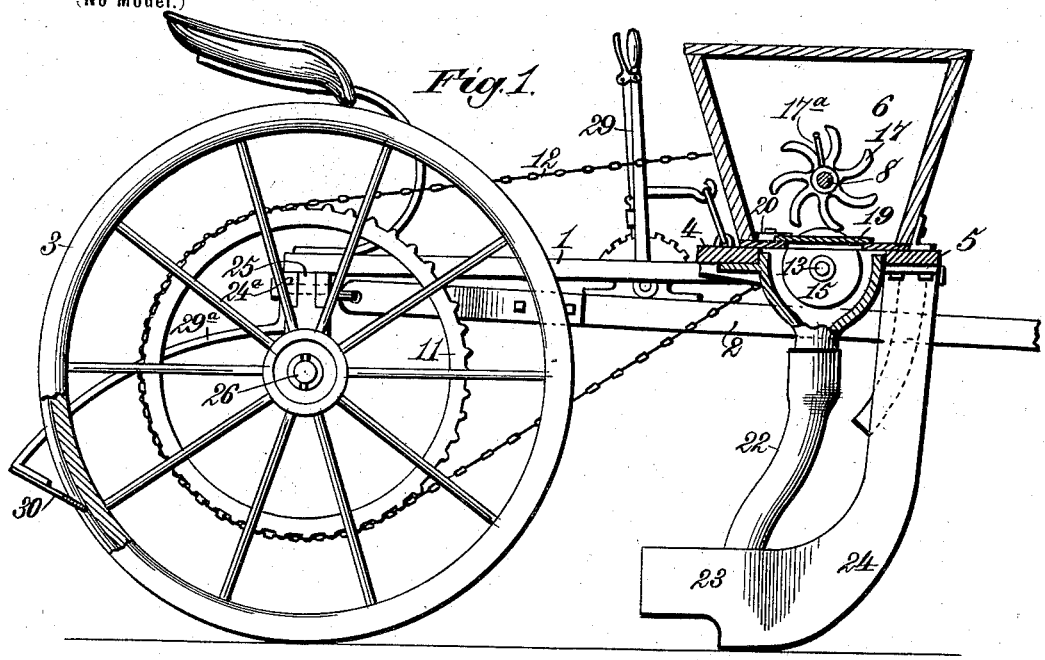
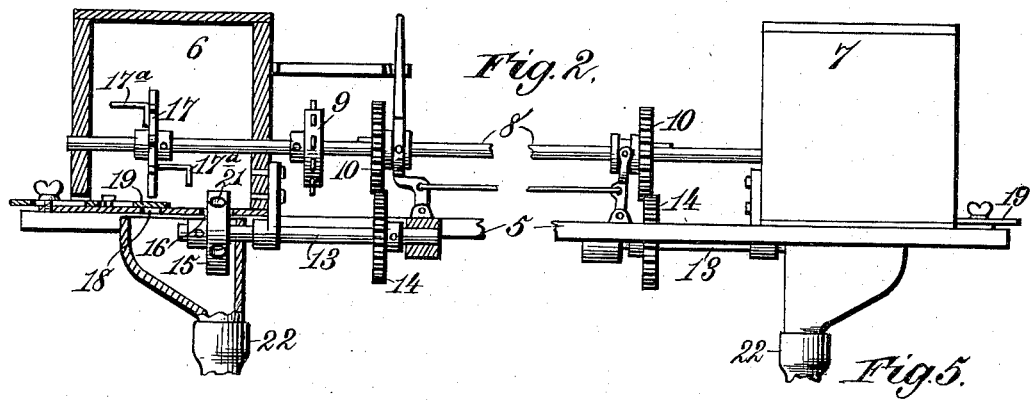
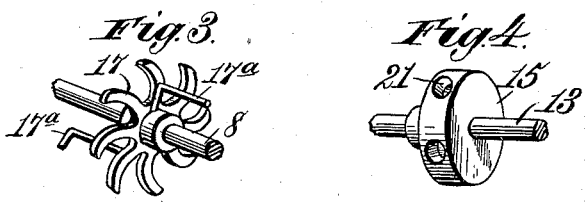 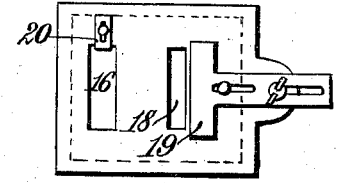
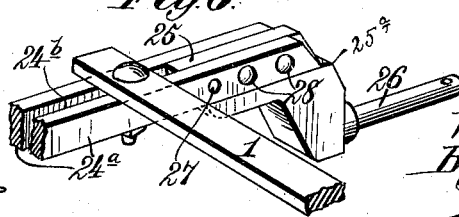
Witnesses:
Robt Erratt
H. B. Keefer
Inventor:
William A. Kile
By James L. Norris
Atty

United States Patent Office.

WILLIAM A. KILE, OF PUTNAM, TEXAS.

COMBINED COTTON-SEED AND CORN PLANTER.

SPECIFICATION forming part of Letters Patent No. 609,279, dated August 16, 1898.

Application filed September 25, 1897. Serial No. 653,036. (No model.)

*To all whom it may concern:*

Be it known that I, WILLIAM A. KILE, a citizen of the United States, residing at Putnam, in the county of Callahan and State of Texas, have invented new and useful Improvements in a Combined Cotton-Seed and Corn Planter, of which the following is a specification.

My invention relates to a combined cotton-seed and corn planter, and has relation to the provision of certain mechanism whereby the same hopper may be used for either purpose.

My invention has further relation to improved means for adjusting the wheels laterally to provide for increasing or diminishing the width of the rows.

My invention has further relation to certain details of construction and operation of parts, all of which will more fully hereinafter appear.

In the accompanying drawings, illustrating my invention, Figure 1 is a side elevation showing one of the hoppers in section. Fig. 2 is a sectional front elevation of the hoppers and their supports and showing the operating mechanism. Fig. 3 is a perspective view of the cotton-seed stirrer. Fig. 4 is a like view of the corn drum or wheel. Fig. 5 is a plan view of the bottom of one of the hoppers; and Fig. 6 is a view of one end of the axle, showing the coupling means for adjusting the width of the wheels.

The numeral 1 indicates the frame, 2 the tongue, and 3 the wheels, of an ordinary planter. Supported at or near the ends of laterally-extending frame-pieces 4 5 are the hoppers 6 7. Journaled in the hoppers and extending through them is a shaft 8, carrying a sprocket-wheel 9 and a gear-wheel 10. On one of the wheels 3 is a sprocket-wheel 11, which is designed to impart motion to the shaft 8 by means of a sprocket-chain 12, connecting the sprocket-wheels 9 and 11. Journaled beneath the hopper in a suitable manner is a shaft 13, carrying at one end a gear-wheel 14, adapted to mesh with the gear-wheel 10, and at its other end the corn wheel or drum 15, which works through a slot 16 in the bottom of the hopper. The shaft 8 also carries the cotton-seed stirrer 17, which works over a slot 18 in the bottom of the hopper. A sliding cut-off plate 19, operated from the outside of the hopper, is employed to close the slot 18 when the hopper is to be used for corn, and a spring cut-off 20 bears on the periphery of the corn drum or wheel 15 to prevent the grains from clogging between the drum and the end of the slot.

By reference to Fig. 4 it will be seen that the drum 15 has pockets 21 at intervals in its periphery to receive the grains of corn. The number of these pockets will determine the frequency at which the grain is dropped to the ground. The drum 15 fits sufficiently snug within the slot 16 to prevent the grains of corn falling between. The cotton-seed-stirrer wheel has preferably the form of a spider-wheel, as shown, the curved or rounded end of its spurs operating to press the seed through the slot 18 and prevent them being carried upward in the revolution of the wheel. This wheel 17 has laterally-extending prongs or fingers $17^a$, which operate to stir the cotton-seed as the wheel is revolved.

A spout 22 leads from the bottom of the hopper to a point between the blades 23 23 of the plow 24, which plow is adapted to open the furrow to receive the seed. I have described only one hopper, that at the opposite side of the planter being alike in all respects to the one described. The gear-wheel 14 is slidable on the shaft 8 to take it out of contact with the gear-wheel 10 when the planter is to be used for dropping cotton-seed.

The axle of the planter is formed of two bars $24^a$ $24^a$, of steel, which are spaced to form a groove $24^b$, adapted to receive a tongue 25 of the axle-spindle 26. At the base of tongue 25 and on each side thereof is provided a shoulder $25^a$, which shoulders engage the under side of the bars $24^a$ $24^a$ and serve as a firm brace for the spindle when the same has been secured in its adjusted position. Suitable bolt-holes 27 are formed in the bars $24^a$ and in the tongue 25 to receive bolts 28. The opposite end of the axle is formed in the same manner. By this construction the tongues 25 may be slid laterally inward and outward in the groove $24^b$ and secured therein at any desired position, whereby to vary the distance between the wheels for different widths of rows. The wheels 3 are concaved on their periphery to cover the furrow made by the plow 24. The tongue 2 is suitably journaled to the axle, and a suitable lever mechanism 29 of the well-known construction connects the tongue and frame of the machine to provide for raising the forward portion of the latter.

Secured to the axle at each side of the planter are spring-arms 29ª, carrying at their free ends scrapers 30, which bear on the concaved peripheries of the wheels 3 to free the same from adhering material.

Having thus fully described my invention, what I claim as new is—

1. In a combined cotton-seed and corn planter the combination with the frame carrying the wheels and hoppers of a shaft journaled in said hoppers carrying a cotton-seed stirrer and a gear-wheel, a supplemental shaft journaled beneath the hoppers carrying a corn-drum and a gear-wheel adapted to mesh with the gear-wheel on the main shaft, means operated by one of the drive-wheels for turning said main shaft, slots formed in the bottom of the hoppers in operative relation to the cotton-seed stirrer and corn-drum, respectively, means for closing the slot for the cotton-seed when it is desired to drop corn, and means for preventing the grains from clogging between the drum and the end of the slot, substantially as described.

2. In a combined cotton-seed and corn planter, the combination with the frame carrying the wheels and hoppers of a shaft journaled in said hoppers and extending between the same and carrying at its ends cotton-seed stirrers and intermediate its ends a sprocket-wheel and gear-wheels, a supplemental shaft journaled beneath each hopper and carrying at one end a gear-wheel adapted to be thrown into and out of mesh with the gear-wheel on the main shaft and at its other end a corn-drum having a plurality of pockets therein, slots formed in the bottom of the hoppers in operative relation with the cotton-seed stirrer and corn-drum, respectively, a slide operated from the outside of the hopper to close the slot for the cotton-seed when it is desired to drop corn, a spring cut-off operating to prevent the clogging of the corn between the drum and the end of the slot, and means operated by the drive-wheel to impart motion through the sprocket-wheel to the shaft, substantially as described.

3. In a combined cotton-seed and corn planter, the combination with the frame and wheels, of an axle consisting of two metallic bars arranged parallel with one another and a suitable distance apart, said bars being provided at each end with a plurality of bolt-holes, axle-spindles having tongues adjustably interposed between the ends of the said bars and at the base of said tongues having shoulders adapted to engage the under side of said bars, said tongues being provided with a plurality of bolt-holes adapted to register with the bolt-holes in the bars, and bolts removably fitted in said bolt-holes for securing the tongues in their adjusted positions, substantially as described.

In testimony whereof I have hereunto set my hand in presence of two subscribing witnesses.

WM. A. KILE.

Witnesses:
M. R. SURLES,
J. S. BURNAM.